(12) United States Patent
Cabezas Morales

(10) Patent No.: US 9,475,069 B2
(45) Date of Patent: Oct. 25, 2016

(54) DEVICE FOR SEPARATION OF PARTICLES FROM A GAS FLOW

(71) Applicant: Nano Control AB, Nacka Strand (SE)

(72) Inventor: Adrian Jose Cabezas Morales, Tullinge (SE)

(73) Assignee: Nano Control AB, Nacka Strand (SE)

( * ) Notice: Subject to any disclaimer, the term of this patent is extended or adjusted under 35 U.S.C. 154(b) by 0 days.

(21) Appl. No.: 14/431,609

(22) PCT Filed: Oct. 9, 2013

(86) PCT No.: PCT/SE2013/051186
§ 371 (c)(1),
(2) Date: Mar. 26, 2015

(87) PCT Pub. No.: WO2014/058382
PCT Pub. Date: Apr. 17, 2014

(65) Prior Publication Data
US 2015/0238979 A1    Aug. 27, 2015

(30) Foreign Application Priority Data
Oct. 9, 2012   (SE) ...................................... 1251142

(51) Int. Cl.
*B01D 45/12* (2006.01)
*B04C 3/04* (2006.01)
(Continued)

(52) U.S. Cl.
CPC ................. *B04C 3/04* (2013.01); *B01D 45/02* (2013.01); *B01D 45/12* (2013.01); *B01D 45/16* (2013.01); *B04C 5/06* (2013.01); *B04C 5/14* (2013.01); *B04C 5/185* (2013.01); *B04C 5/26* (2013.01)

(58) Field of Classification Search
CPC ... A47L 9/1633; A47L 9/1666; B01D 45/12; B01D 45/16; B01D 45/02; B04C 3/04; B04C 5/14; B04C 5/185; B04C 5/06; B04C 5/26
See application file for complete search history.

(56) References Cited

U.S. PATENT DOCUMENTS 1,897,195 A * 2/1933 Howden .................. B04C 1/00
                                                                        209/723
2,372,514 A * 3/1945 Pootjes ..................... B04C 5/24
                                                                        209/712

(Continued)

FOREIGN PATENT DOCUMENTS

CN      88 2 12313 U    11/1988
CN       2573056 Y       9/2003
(Continued)

*Primary Examiner* — Dung H Bui
(74) *Attorney, Agent, or Firm* — Blank Rome LLP

(57) ABSTRACT

A device (1) for separation of particles from a flow of gas is described. The device (1) comprises a first cyclone generator (6) comprising a first cyclone tube (8) with a length axis (4) and a first blocking means (9) arranged so that an annular first inlet (10) is arranged between the first cyclone tube (8) and the first blocking means (9). A first vortex generator (11) is arranged in the first inlet (10). The device comprises a further cyclone generator (12) comprising a further cyclone tube (13) with a length axis (4) and a further blocking means (14) arranged so that an annular further inlet (15) is arranged between the second cyclone tube (13) and the further blocking means (14), and a further vortex generator (16) arranged in the further inlet (15), and an outlet tube (22) comprising an outlet (23) and a length axis (4), which outlet tube (22) is arranged concentric in relation to the second cyclone tube (13). The first blocking means (9) overlaps the further inlet (15) seen in the direction of the length axis (4) and the second blocking means (14) has essentially the same extension as the outlet (23) seen in the direction of the length axis (4). The further cyclone generator (12) is arranged between the first cyclone generator (6) and the outlet (23).

20 Claims, 6 Drawing Sheets

(51) Int. Cl.
*B01D 45/02* (2006.01)
*B04C 5/26* (2006.01)
*B04C 5/06* (2006.01)
*B04C 5/14* (2006.01)
*B04C 5/185* (2006.01)
*B01D 45/16* (2006.01)

(56) References Cited

U.S. PATENT DOCUMENTS

| | | | | |
|---|---|---|---|---|
| 2,402,845 A * | 6/1946 | Rodman | | B04C 7/00 |
| | | | | 55/345 |
| 2,569,710 A | 10/1951 | Fitzpatrick | | |
| 2,931,458 A * | 4/1960 | Vane | | B01D 47/16 |
| | | | | 261/118 |
| 2,967,618 A | 1/1961 | Vane | | |
| 3,885,933 A * | 5/1975 | Putney | | B01D 45/12 |
| | | | | 209/723 |
| 4,221,655 A | 9/1980 | Nakayama et al. | | |
| 4,289,611 A | 9/1981 | Brockmann | | |
| 5,186,607 A | 2/1993 | Yang et al. | | |
| 6,533,844 B1 * | 3/2003 | Hiltunen | | B01D 45/16 |
| | | | | 55/345 |
| 7,434,694 B1 | 10/2008 | Elvin | | |
| 7,632,324 B2 * | 12/2009 | Makarov | | A47L 5/30 |
| | | | | 15/350 |
| 7,976,597 B2 * | 7/2011 | Smith | | A47L 9/1625 |
| | | | | 15/352 |
| 8,152,882 B2 * | 4/2012 | Wolsfeld | | B01D 45/08 |
| | | | | 55/307 |
| 8,741,014 B2 * | 6/2014 | Kondo | | B01D 45/14 |
| | | | | 55/392 |
| 8,764,886 B2 * | 7/2014 | Halpap | | B01D 45/12 |
| | | | | 55/315 |
| 8,945,264 B2 * | 2/2015 | Craig | | B04C 5/04 |
| | | | | 55/315 |
| 8,974,568 B2 * | 3/2015 | Hofer | | B01D 45/16 |
| | | | | 55/424 |
| 9,017,440 B2 * | 4/2015 | Yao | | F25B 9/04 |
| | | | | 55/413 |
| 2001/0054213 A1 | 12/2001 | Oh et al. | | |
| 2005/0000200 A1 * | 1/2005 | Christiansen | | B04C 3/06 |
| | | | | 55/456 |
| 2007/0199284 A1 * | 8/2007 | Yoo | | A47L 9/1633 |
| | | | | 55/345 |
| 2008/0133110 A1 * | 6/2008 | Vetrovec | | F02B 29/0412 |
| | | | | 701/103 |
| 2008/0223010 A1 * | 9/2008 | Han | | A47L 9/1633 |
| | | | | 55/345 |
| 2009/0133370 A1 | 5/2009 | Yoo et al. | | |
| 2009/0241491 A1 | 10/2009 | Han et al. | | |
| 2009/0255272 A1 * | 10/2009 | Tibell | | F25B 9/04 |
| | | | | 62/5 |
| 2010/0236012 A1 | 9/2010 | Horne | | |
| 2012/0167336 A1 * | 7/2012 | Tran | | A47L 9/1633 |
| | | | | 15/347 |
| 2013/0199137 A1 | 8/2013 | Hallgren et al. | | |
| 2015/0216382 A1 * | 8/2015 | Bower | | A47L 9/16 |
| | | | | 55/320 |
| 2015/0273374 A1 * | 10/2015 | Leiss | | B01D 45/06 |
| | | | | 95/271 |
| 2015/0273483 A1 * | 10/2015 | Krishnamurthy | | B04C 3/06 |
| | | | | 95/269 |

FOREIGN PATENT DOCUMENTS

| | | |
|---|---|---|
| CN | 101556092 A | 10/2009 |
| CN | 102489418 A | 6/2012 |
| EP | 1 969 986 A1 | 9/2008 |
| GB | 2 424 603 A | 10/2006 |
| SE | 1100739 A1 | 4/2013 |

\* cited by examiner

DEVICE FOR SEPARATION OF PARTICLES FROM A GAS FLOW

TECHNICAL FIELD

The present invention relates to a device for separation of particles from a gas flow, especially such a device intended for an industrial process. In particular the present invention relates to a device for separation of nanoparticles from a gas flow.

DESCRIPTION OF THE PRIOR ART

Devices for particle separation are used within several different areas. Particles may be separated in many different ways such as for example with filters or with cyclones. Filters may be made efficient but have the major drawback that they with time are clogged by the particles which are filtered out. If the gas from which the particles are to be filtered out contains a high concentration of particles the filters have to be changed often. In such cases it might be advantageous to use a so called cyclone separator in which gas to be filtered is forced to rotate in a vortex, wherein the particles are thrown out towards the sides where they are separated. Cyclone separators must usually be completed with particle filters in order to remove microparticles from the gas.

US 2008/0223010 describes a dust separating apparatus in a vacuum cleaner, which apparatus includes cyclone units which are arranged concentrically so that the gas with the particles which are to be separated must move inwards in order to enter the next cyclone unit. The cyclone units are arranged so that the direction of the gas is turned between the cyclone units. In that way a compact apparatus is provided, which is desirable for a vacuum cleaner.

U.S. Pat. No. 4,289,611 describes an alternative cyclone separator intended to be used as a dust filter for machines which take in air for their operation. The cyclone separator has a first and a second casing, in the upstream ends of which there is arranged spiral formed blades to bring the gas to rotate. The upstream end of the second casing is arranged enclosed by the downstream end of the first casing with an annular gap between the first casing and the second casing. Between the outlet end of the second casing and an outlet pipe, enclosed by the second casing, a second annular gap is arranged. Particles in the gas will to some extent be filtered out and end up in the gap between the casings and the gap between the casing and the outlet pipe.

SUMMARY OF THE INVENTION

An object of the present invention is to provide a device for separation of particles from a gas flow, which device comprises a cyclone separator which is an alternative to such devices according to the prior art.

Another object of the present invention is to provide a device for separation of particles from a gas flow, which device comprises a cyclone separator and which in comparison to the prior art more efficiently separates particles from the gas flow.

A further object of the present invention is to provide a device for separation of particles from a gas flow, which device in comparison to the devices according to the prior art, more efficiently separates nanoparticles.

In this context nanoparticles are defined as particles the largest dimension of which is smaller than 1 micrometre.

At least one of these objects is fulfilled with a device according to the independent claim.

Further advantages are provided with the features in the following dependent claims.

A device according to the invention for separation of particles from a flow of gas, comprises a first cyclone generator comprising a first cyclone tube with a length axis and a first blocking means arranged so that an annular first inlet is arranged between the first cyclone tube and the first blocking means, and a first vortex generator arranged in the annular first inlet. The device also comprises a further cyclone generator comprising a further cyclone tube with a length axis and a further blocking means arranged so that an annular further inlet is arranged between the further cyclone tube and the further blocking means, and a further vortex generator arranged in the annular further inlet at a distance from the first vortex generator. The device also comprises an outlet tube comprising an outlet and a length axis, which outlet tube is arranged concentrically in relation to the second cyclone tube, wherein the first cyclone tube encloses the further cyclone tube at a distance from the further cyclone tube. The device is characterized in that the first blocking means overlaps the further inlet seen in the direction of the length axis so that the particles after the passage of the vortex generator in the first cyclone generator has to be moved inwards towards the length axis in order to be able to enter into the inlet to the following cyclone generator, and that the further blocking means essentially overlaps the outlet seen in the direction of the length axis towards the outlet, and that the further cyclone generator is arranged between the first cyclone generator and the outlet.

The further blocking means overlapping the outlet means that the particles have to be moved inwards towards the length axis to be able to enter into the inlet to the following cyclone generator.

Thus, a cyclone generator in this application comprises a tube called cyclone tube which has the function of bringing the air into rotation. The vortex generator may comprise angled blades which control the direction of movement of the particles.

With a device according to the invention a better filtration of the gas is provided in comparison with devices according to the prior art thanks to the blocking means which prevent particles from being conveyed from a cyclone generator to the inlet of a following cyclone generator along the length axis of the device. In a device according to the invention the particles after the passage of the vortex generator have to be moved inwards towards the length axis in order to be able to enter the inlet of the following cyclone generator. Furthermore, the placement of the vortex generators after each other along the length axis results in that the gas is conveyed mainly in the direction along the length axis all the time without any change in direction. This contributes to an efficient filtration of the gas.

The device may be arranged with the length axis essentially vertical. Such a placement facilitates the filtration of the particles in the gas.

The device may comprise a second cyclone generator comprising a second cyclone tube with a length axis and a second blocking means arranged so that an annular second inlet is arranged between the second cyclone tube and the second blocking means, and a second vortex generator arranged in the inlet end of the second cyclone tube at a distance from the first vortex generator. With such a second cyclone generator in addition to the first and the further cyclone generator a further improved filtration of the gas is provided. The further cyclone generator is then the third cyclone generator, the further cyclone tube is then the third cyclone tube, the further blocking means is the third blocking means, the further inlet is the third inlet, and the further vortex generator is the third vortex generator. The further cyclone generator is then a third cyclone generator, the further cyclone tube is a third cyclone tube, the further blocking means is a third blocking means, the annular further inlet is a third inlet, and the further vortex generator is a third vortex generator.

The device may be arranged so that the outlet tube and the cyclone generators are arranged with their length axes essentially parallel to each other. This contributes to simplifying the construction in order to provide an efficient filtration.

The device may comprise a primary blocking means which is arranged at a distance from the first cyclone generator and which essentially overlaps the first inlet seen in the direction of the length axis towards the first inlet. Such a primary blocking means prevents particles from being conveyed straight into the first inlet along the length axis. In case the length axis is arranged vertically it is avoided that larger particles or objects fall straight into the first inlet.

The device may comprise an outer casing arranged enclosing the first cyclone tube at a distance from the first cyclone tube and comprising a primary inlet in through the outer casing. With such an outer casing the arrangement of the device for preventing particles from coming in through the first inlet is facilitated.

The primary inlet may be arranged on the opposite side of the primary blocking means in relation to the first vortex generator. In that way the gas that passes in through the first inlet must first have passed the gap between the primary blocking means and the outer casing. This makes it more difficult for in particular larger particles to enter through the first inlet.

The device may comprise an outer casing arranged enclosing the first cyclone tube at a distance from the first cyclone tube and a primary inlet in through the outer casing, wherein the primary inlet is arranged below the annular first inlet when the length axis is arranged vertical with the annular first inlet above the annular further inlet. With such an arrangement of the primary inlet a more compact device is provided than if the primary inlet is arranged above the annular first inlet. Furthermore, no primary blocking means is needed. The major part of the particles that enter with the gas through the primary inlet will fall down between the first cyclone tube and the outer casing.

Preferably, the primary inlet is arranged so that the gas flow is directed along the periphery of the outer casing and somewhat downwards. This provides for separation of the major part of larger particles from the gas flow and separation also of some fine particles and thereby decreases the amount of particles which are conveyed to the first vortex generator.

The outer casing may comprise a conical portion below the primary inlet, wherein the conical portion tapers downwards. Such a conical portion is advantageous in order to convey the major part of the larger particles from the gas flow.

The device may comprise a wall means which extend from the outer casing and which has such an extent downwards so that, in use, the flow of gas must move downwards before the flow of gas may move upwards on the outside of the first cyclone tube. With such a wall means the risk that larger particles or that a large concentration of particles is to be conveyed with the gas flow from the primary inlet directly to the annular first inlet, is reduced.

The cyclone tubes may comprise a far end which is arranged on the far side of the outlet in relation to the vortex generators and which is wider perpendicular to the length axis than the inlets to the cyclone tubes. With such a wider far end the collection of particles is facilitated as the vortex which has been generated by the vortex generators is disturbed by the wider far end.

The device may in the far end of the innermost cyclone tube comprise a conical vortex dissolver which is arranged with the narrow end directed towards the vortex generators. With such a vortex dissolver the vortex is attenuated beyond the vortex dissolver which decreases the risk for particles, which have passed the vortex dissolver earlier and have been separated, to again be stirred up by the vortex.

The side of the conical vortex dissolver, which is turned away from the vortex generators, may comprise a cavity and in the cavity be provided with tabs, the planes of which are parallel to the length axes. Such an arrangement of the vortex dissolver damps the vortex further.

The outlet tube from the outlet may extend in a direction towards the vortex generators. With such an arrangement of the outlet tube a compact device may be provided.

In case the outlet tube from the outlet extends in a direction towards the vortex generators, the distance between the outlet and the vortex dissolver may be in the interval 5-200% and preferably in the interval 20-100% of the distance between the outlet and the most nearby of the vortex generators. Such a distance prevents the vortex from being disturbed to close to the outlet which could deteriorate the filtration and also create a large pressure drop.

Alternatively, the outlet tube from the outlet may extend in a direction away from the vortex generators. This give rise to a somewhat longer device but may on the other hand lead to a more efficient filtration as the gas does not have to change direction as much to enter through the outlet which decreases the pressure drop in the system.

In case the outlet tube from the outlet extends in a direction away from the vortex generators the distance between the outlet and the vortex dissolver may be in the interval 50-800% and preferably in the interval 100-400% of the distance between the outlet and the most nearby of the vortex generators.

The distance along the length axis between one of the vortex generators and a following vortex generator may be less than or equal to the length of the vortex generator along the length axis. In this way the risk that particles after all are conveyed with the gas into the inlet to the following vortex generator, is minimized.

The cyclone tubes and the outer casing may be open in their lower end, wherein the outer casing is adapted for arrangement of a plastic bag on the outside of the outer casing which covers the lower edge of the outer casing. When a plastic bag is arranged over the outer casing it will, during operation, be sucked up against the lower edge of the cyclone tubes and the outer casing, wherein separate compartments will be created between the cyclone tubes and between the first cyclone tube and the outer casing. When the vacuum suction in the outlet tube ceases the plastic bag will fall down wherein the contents in all compartments will fall down into the plastic bag. Such open ends which are sealed by a plastic bag facilitate the handling of particles which have been separated from the gas flow during the entire separation process. As an alternative to a plastic bag the lower end of the cyclone tubes and the outer casing may be sealed with one of more hatches. However, particles must anyway be conveyed to some disposal container why the solution with a plastic bag is simpler.

The device may comprise a liquid container and at least one liquid outlet nozzle in connection with the liquid container from which liquid outlet nozzle liquid is feeded and conveyed to the inside of one of the cyclone tubes.

SHORT DESCRIPTION OF THE DRAWINGS

In the following a detailed description of embodiments of the invention follows with reference to the appended drawings on which:

DESCRIPTION OF PREFERRED EMBODIMENTS OF THE INVENTION

Figure 1:
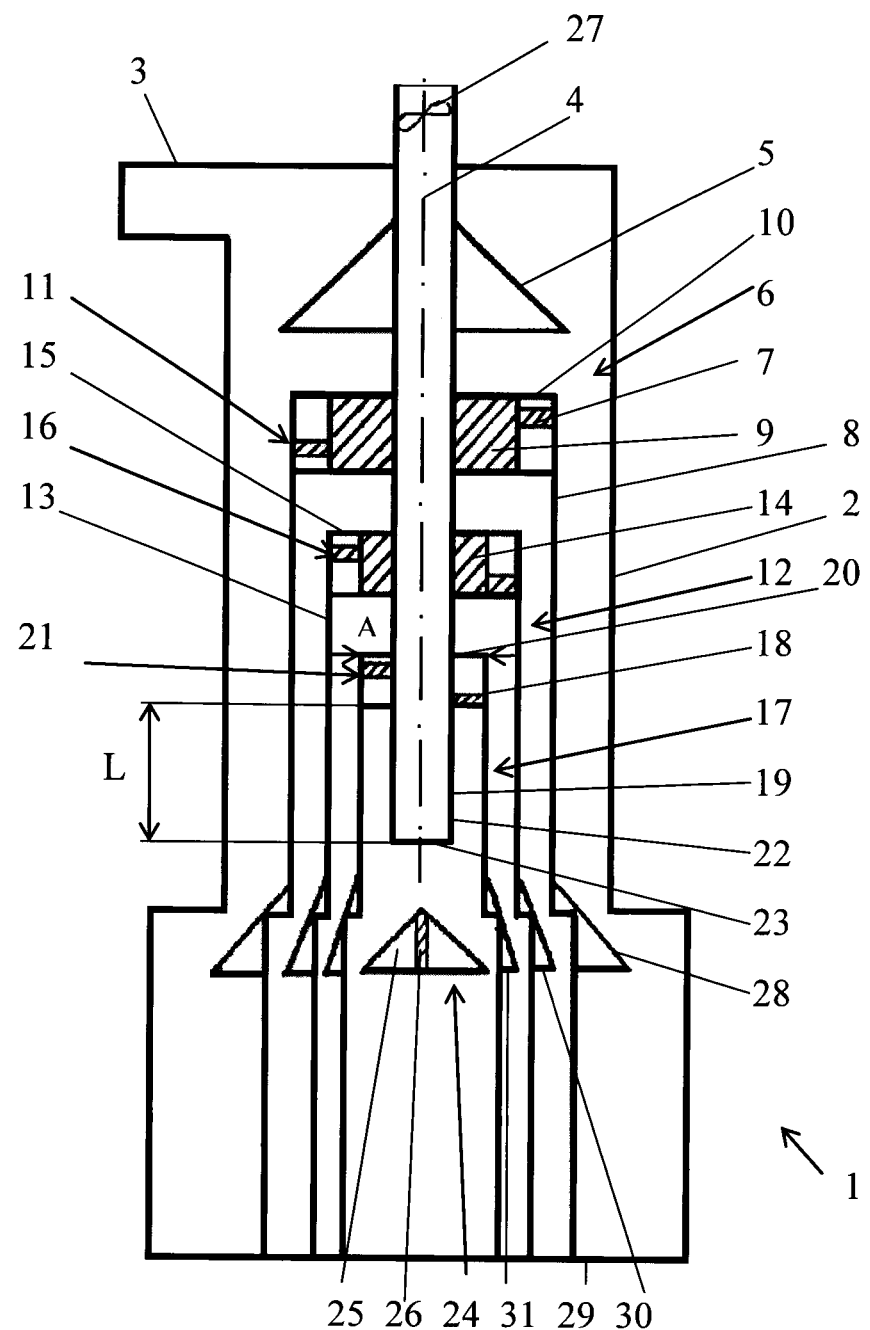
FIG. 1 shows a device according to a preferred embodiment of the present invention in which the primary inlet is arranged in the upper part of the device and the outlet leads upwards.

In the following description of preferred embodiments of the invention corresponding features in the different figures will be denoted by the same reference numeral. The appended drawings are not drawn to scale but show only the principles of the invention.

FIG. 1 shows in cross section a device 1 according to a preferred embodiment of the present invention. The device 1 comprises an outer casing 2 with a primary inlet 3 arranged in the upper part of the device 1. In the shown embodiment the primary inlet 3 is arranged in the side of the outer casing 2. It is, however, possible to let the primary inlet 3 have a completely different form. It should for example be possible to let the primary inlet be comprised of an upwardly open outer casing 2 or by completely excluding the outer casing 2. The device 1 has a length axis 4 which extends through the device 1. In the upper part of the device 1 there is arranged a primary blocking means 5, which is conical and which expands in the direction downwards from the primary inlet. A first cyclone generator 6 is arranged below the primary blocking means 5. The first cyclone generator 6 comprises a first cyclone tube 8 with a length axis which coincides with the length axis 4 of the device 1. The first cyclone generator 6 comprises also a first blocking means 9 arranged so that an annular first inlet 10 is arranged between the first cyclone tube 8 and the first blocking means 9. The first cyclone generator 6 comprises also a first vortex generator 11 in the form of tilted fins 7 which are arranged so that gas cannot pass straight through the vortex generator along the length axis and which give the gas a rotation around the length axis. Such vortex generators have been used in prior cyclone generators and are previously well known to persons skilled in the art why they will not be described in detail here. The primary blocking means 5 is arranged so that it essentially overlaps the first annular inlet 10 seen in the direction of the length axis.

The device 1 comprises also a second cyclone generator 12 with a second cyclone tube 13 and a length axis which coincides with the length axis 4 of the device 1. The second cyclone generator 12 comprises a second cyclone tube with a length axis which coincides with the length axis 4 of the device 1 and a second blocking means 14 arranged so that an annular second inlet 15 is arranged between the second cyclone tube 13 and the second blocking means 14. Correspondingly as for the first cyclone generator 6 there is arranged a second vortex generator 16 in the annular second inlet 15, which second vortex generator is of the same type as the first vortex generator 11. The first blocking means 9 is arranged so that it essentially overlaps the annular second inlet 15 seen in the direction along the length axis 4. The term "essentially" as used herein means "substantially."

The device 1 comprises also a further cyclone generator in the form of a third cyclone generator 17 with a third cyclone tube 18 and a length axis which coincides with the length axis 4 of the device 1, and a third blocking means 19 arranged so that an annular third inlet 20 is arranged between the third cyclone tube 18 and the third blocking means 19. Correspondingly as for the first cyclone generator 6 there is arranged a third vortex generator 21 in the annular third inlet 20, which third vortex generator 21 is of the same type as the first vortex generator 11. The second blocking means 14 is arranged so that it essentially overlaps the annular third inlet 20 seen in the direction along the length axis 4.

The first cyclone tube 8 encloses the second cyclone tube 13 which in turn encloses the third cyclone tube 18.

The device 1 also comprises an outlet tube 22 with an outlet 23 and a length axis which essentially coincides with the length axis 4. In the embodiment in FIG. 1 the outlet tube 22 extends up through the blocking means 9, 14, 19. Below the outlet 23 there is arranged a conical vortex dissolver 24 which is directed with the narrow part directed towards the vortex generators. The side of the conical vortex dissolver which is turned away from the vortex generators comprises a cavity 25 and in the cavity it is provided with tabs 26, the planes of which are parallel to the length axis 4. The number of tabs 26 is preferably larger than two. An air exhauster 27 is arranged in the outlet tube in order to drive a gas flow from the inlet to the outlet. As is evident from the drawing the outlet tube 22 also constitutes the third blocking means 19.

Between the outer casing 2 and the first cyclone tube 8 there is a space. In the lower part of the space there is a first conical means 28 at a distance from the bottom 29 of the space between the outer casing 2 and the first cyclone tube 8. The conical means 28 is arranged to prevent turbulence at the bottom 29, which turbulence could stir up particles at the bottom 29, which previously have been separated from the gas flow. In a corresponding way there is arranged a second conical means 30 on the outside of the second cyclone tube 13 at a distance from the bottom 29 and a third conical means 31 on the outside of the third cyclone tube 18 at a distance from the bottom 29.

The function of the device 1 according to the embodiment in FIG. 1 will now be described. In operation of the device the air exhauster 27 is driven to drive a gas flow up through the outlet tube 22. Air will then be sucked in through the primary inlet 3 and further through the cyclone generators 6, 12, 17, in which the gas will be brought into rotation by the vortex generators 11, 16, 21, and further in through the outlet 23. The primary blocking means 5 prevents larger particles, which pass in through the primary inlet 3 together with the gas, from entering the annular first inlet 10 by the primary blocking means 5 essentially overlapping the annular first inlet 10. Thus, larger particles will fall down at the outer edge of the outer casing 2 past the conical means 28. The gas with the smaller particles will flow through the annular first inlet and through the first vortex generator 11 which brings the gas to rotate so that a vortex is generated inside the first cyclone generator 6. Particles in the gas will then be forced out towards the outer edge of the first cyclone tube in dependence of their size. The larger the particles are the more they will be forced out towards the edge. Thus, the larger particles in the gas flow will pass on the outside of the second cyclone tube and pass the second conical means 30. The gas together with some particles will pass the annular second inlet 15 and the second vortex generator 16 in which gas is brought to rotate so that a vortex is generated inside the second cyclone generator 12. In a similar way as has been described above the particles that are left in the gas are forced out towards the second cyclone tube 13 and pass outside the annular third inlet between the second cyclone tube 13 and the third cyclone tube 18 down past the third conical means 31. The gas together with the remaining particles will pass the third vortex generator 21 in which the gas will be brought to rotate so that a vortex is generated below the third vortex generator 21, wherein the particles again will be forces outwards.

The gas that has passed the third vortex generator 21 will generate a vortex below the outlet 22 and pass out through the outlet 23 and the outlet tube 22. Some of the particles which have passed the third vortex generator 21 will pass at the side of the vortex dissolver 24 and be collected at the bottom 29. The tabs 26 contribute to dissolving the vortex. Thus, particles will be separated in steps during the passage through the vortex generators and the gas will contain considerably fewer particles in the outlet tube compared to in the primary inlet. As the cross sectional area for the cyclone tubes decreases downstream the speed of the gas will increase correspondingly.

The distance along the length axis between the third vortex generator 21 and the outlet is L. The distance along the length axis between the outlet and the vortex dissolver is preferably in the interval 0.2 L-L, but may be between 0.05 L and 2 L. The distance along the length axis between a vortex generator and a following vortex generator is preferably larger than or equal to the extension along the length axis of the first mentioned vortex generator. The diameter of the third cyclone tube 18 is at the bottom 29 larger than the diameter A of the third cyclone tube 18 at the third annular inlet 20. The diameter of the third cyclone tube 18 is at the bottom 29 preferably in the interval 1 A-1.5 A and most preferred in the interval 1.1 A-1.3 A. The third cyclone tube widens over the bottom end of the vortex dissolver 24. The vortex dissolver has a diameter in the interval 0.9 A-1.4 A and preferably in the interval 1.0 A-1.2 A.

Figure 2:
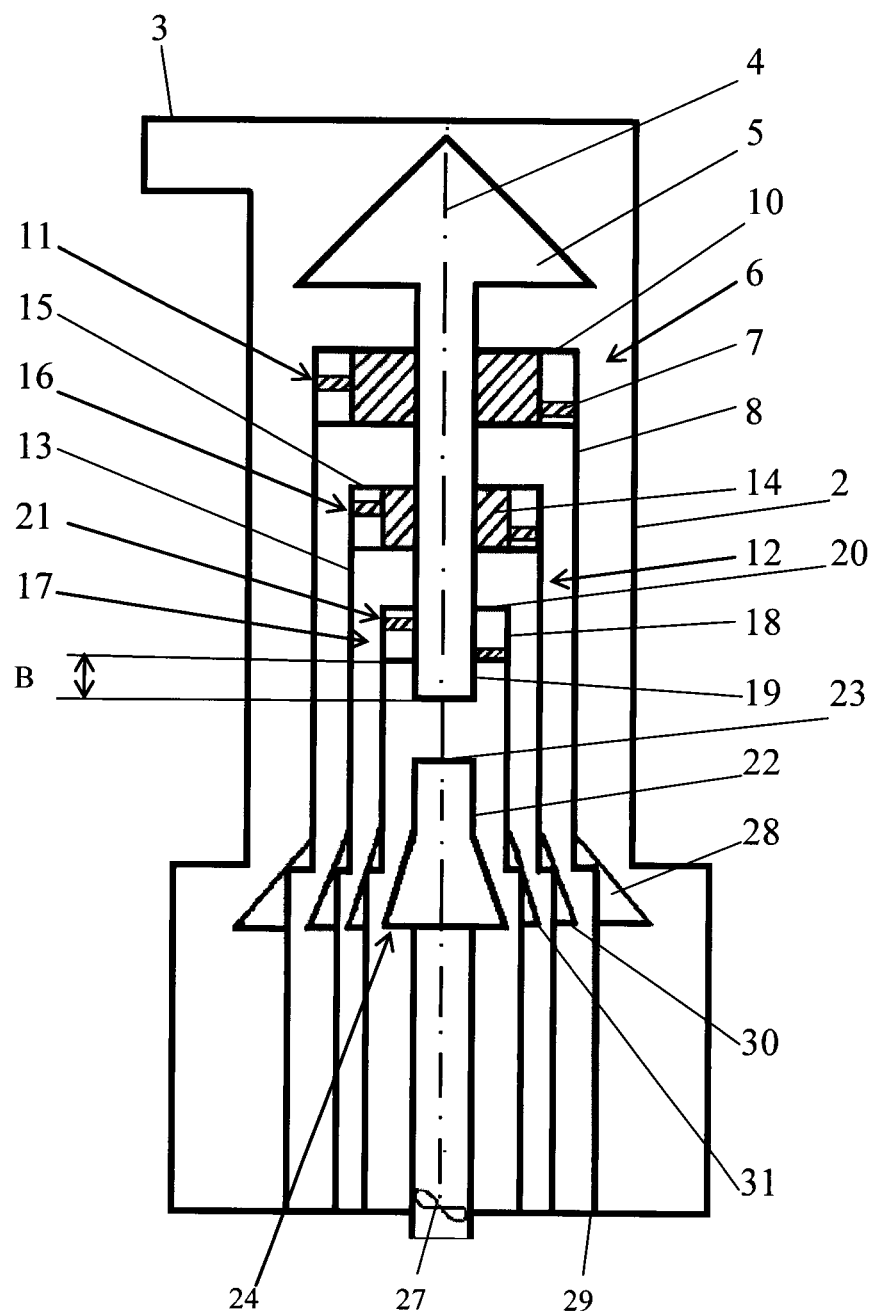
FIG. 2 shows a device according to an alternative embodiment of the present invention in which the primary inlet is arranged in the upper part of the device and the outlet leads downwards.

FIG. 2 shows a device according to an alternative embodiment of the present invention in which the primary inlet 3 is arranged in the upper part of the device 1 and the outlet 22 is directed downwards. Primarily, the differences between the embodiment in FIG. 1 and the embodiment in FIG. 2 will be described. In contrast to the embodiment in FIG. 1 the outlet tube extends downwards from the outlet. Thus, the gas does not have to change direction as much as in the embodiment of FIG. 1. In the embodiment shown in FIG. 2 the third blocking means 19 extends a distance B below the third vortex generator 21. The distance along the length axis between the third vortex generator 21 and the outlet 23 is in the interval B-4 B. In a corresponding way as in the embodiment of FIG. 1 the third cyclone tube is wider at the bottom than at the annular third inlet. The third cyclone tube expands above the lower end of the vortex dissolver 24.

Figure 3:
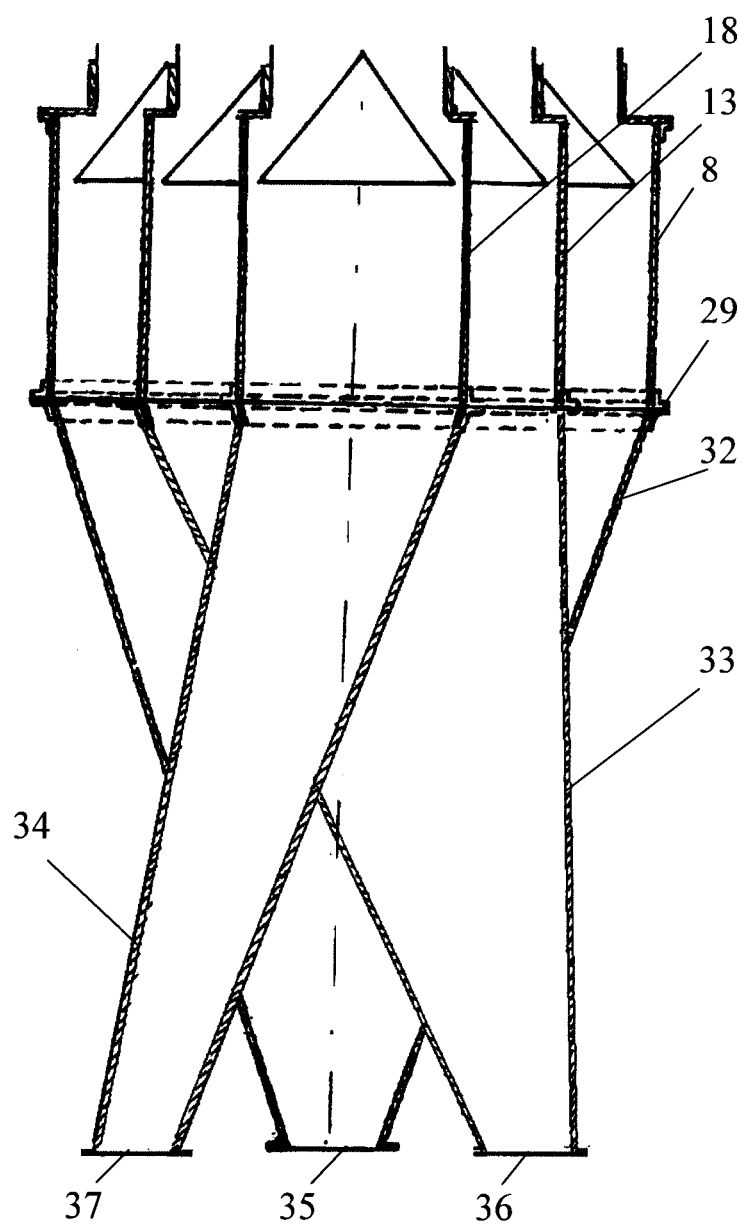
FIG. 3 shows the lower part of a device similar to the embodiment in FIG. 1.

FIG. 3 shows the lower part of a device similar to the embodiment in FIG. 1. In the embodiment shown in FIG. 3 the collection devices 32, 33, 34, are connected to the bottom 29 of the cyclone tubes 8, 13, 18. The collection devices collect particles which have been separated in the cyclone generators 6, 12, 17. In the bottom of the collection devices there is arranged draining gates 35, 36, 37, through which particles which have been filtered out may be emptied.

Figure 4:
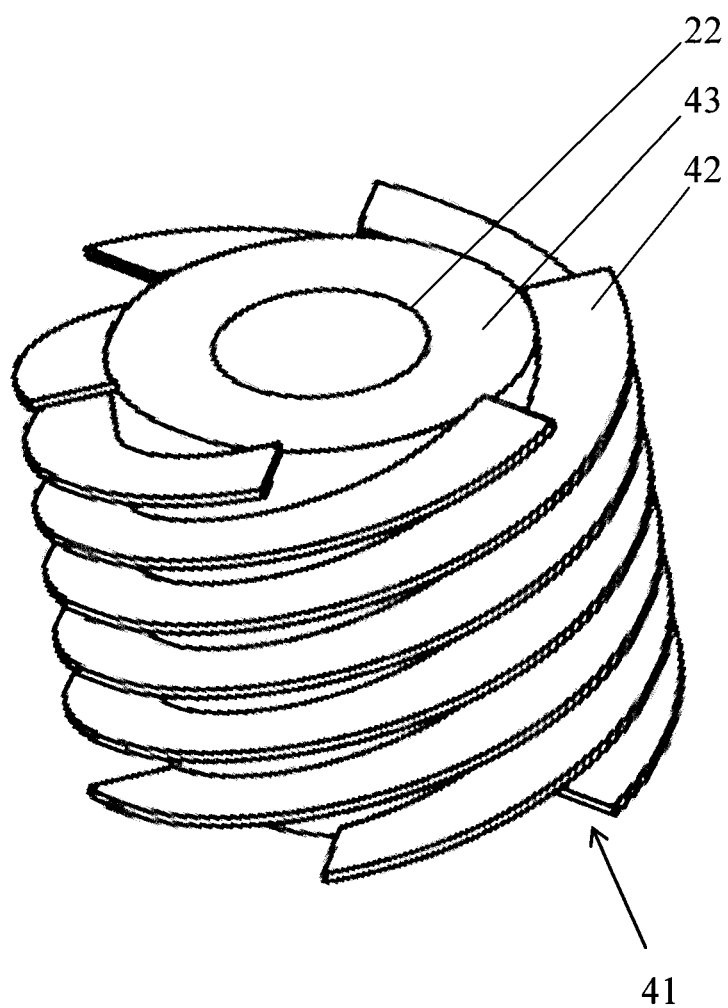
FIG. 4 is a perspective view of a vortex generator.

FIG. 4 is a perspective view of a vortex generator 41, which comprises six tilted fins 42 arranged on a blocking means 43 which encloses an outlet tube 22. In the shown embodiment each one of the fins 42 extends approximately one entire turn around the outlet pipe. It is, however, possible to let the fins 42 extend a smaller part of the turn around the outlet pipe. It is important that the gas is given a rotation when the gas passes the vortex generator 41. FIG. 4 thus shows only the principle for a vortex generator 41. The vortex generator may have any one of many different shapes with more or fewer fins 42 than in FIG. 4 and with larger or smaller ascent than in FIG. 4.

Figure 5:
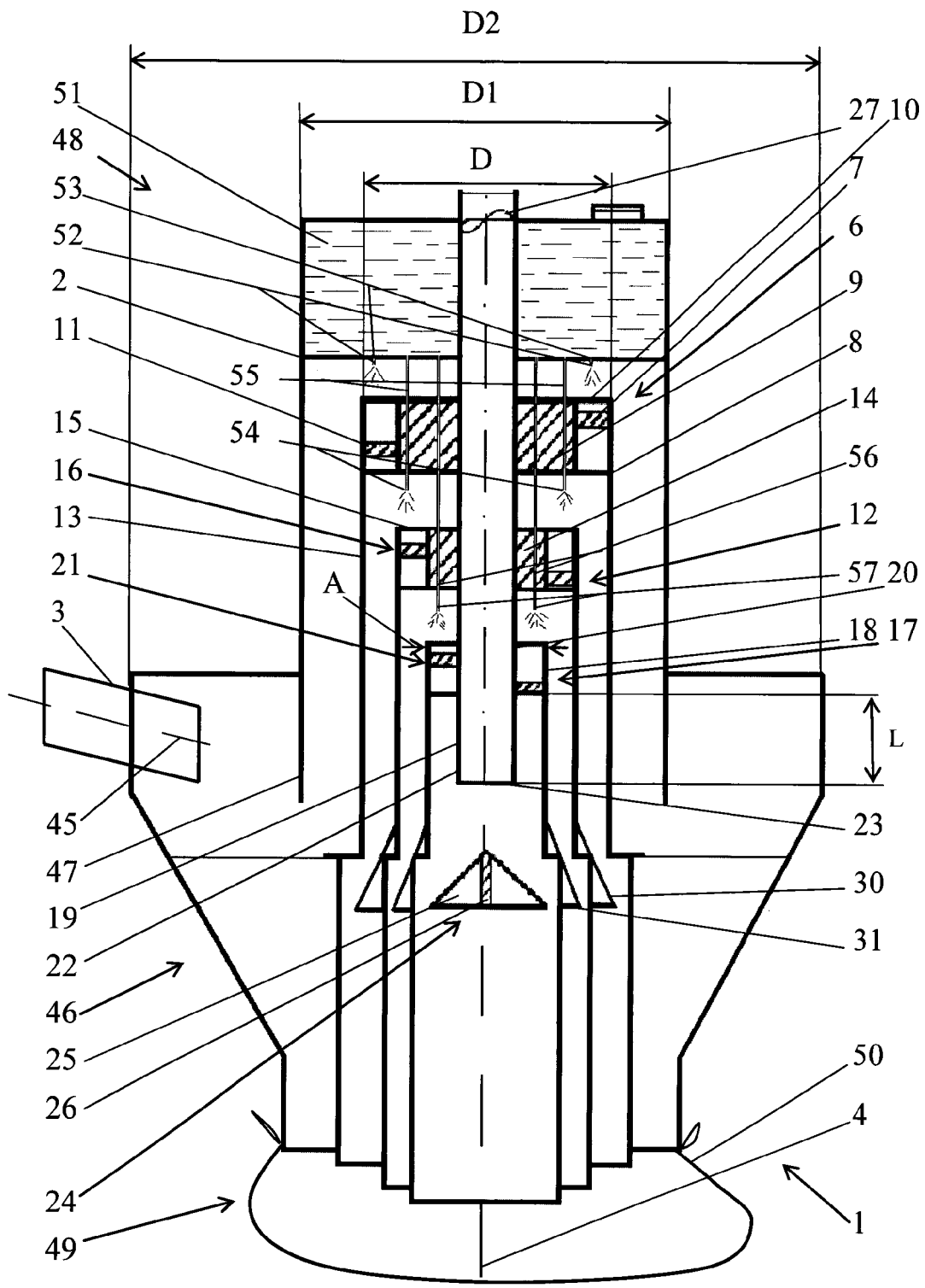
FIG. 5 shows a device according to an alternative embodiment of the invention in which the primary inlet is arranged between the upper end and the lower end.

FIG. 5 shows a device 1 according to an alternative embodiment of the invention. The device comprises a first cyclone generator 6, a second cyclone generator 12 and a third cyclone generator as has been described in connection with the description of FIG. 1 above. In the following only the differences between the embodiment in FIG. 1 and the embodiment in FIG. 5 will be described. The outer casing 2 is arranged with the primary inlet 3 arranged below the annular first inlet. Below the inlet the outer casing 2 comprises a conical portion 46. As is evident from FIG. 5, the primary inlet 3 is directed along a symmetry axis 45 which is tilted somewhat downwards in relation to the horizontal plane. The angle between the length axis and said symmetry axis 45 is preferably in the interval 30°-90°. With such a tilting of the inlet the gas flow will be directed downwards which will contribute to moving particles in the gas flow down to the conical portion 46. Inside the primary inlet 3 in the direction towards the length axis 4 there is arranged a wall means 47 which extends downwards from the upper portion 48 of the outer casing so that the gas flow from the primary inlet must move downwards before the flow of gas may move upwards on the outside of the first cyclone tube 8 on the inside of the upper portion 48 of the outer casing. Preferably, the primary inlet is also directed so that it is directed along the periphery of the outer casing 2. In FIG. 5 the wall means is an extension of the upper portion 48 of the outer casing. In use the gas flow will, thus, be led downwards so that is passes below the wall means 47 in order to subsequently be led upwards between the outside of the first cyclone tube 8 and the inside of the upper portion 48 of the outer casing. The larger particles and also some fine particles will then be separated and fall down into the conical portion 46. In the lower part 49 of the device the cyclone tubes 8, 13, 18, and the outer casing 2 are open. A plastic bag 50 may be connected enclosing the lower part of the outer casing 2. In use the underpressure in the cyclone tubes 8, 13, 18, and the outer casing 2 will lead to the plastic bag being sucked up and closing the openings in the lower part of said tubes 2, 8, 13, 18. The plastic bag may easily be removed together with its contents of separated particles. The device 1 in FIG. 5 comprises also a liquid container 51. The liquid which is filled into the liquid container may be ordinary water. A first set of liquid outlet nozzles 52 is connected to a first set of liquid conduits 53 to the liquid container 51 and is arranged to move liquid onto the inside of the first cyclone tube 8. In the corresponding way the device in FIG. 5 comprises a second set of liquid outlet nozzles 54, which is connected with a second set of liquid conduits 55 to the liquid container 51 and which is arranged to move liquid onto the inside of the second cyclone tube 13, and a third set of liquid outlet nozzles 56, which is connected with a third set of liquid conduits 57 to the liquid container 51 and which is arranged to move liquid onto the inside of the third cyclone tube 18. The liquid is moved into the cyclone tubes through the liquid outlet nozzles 52, 54, 56, and is trapped by the gas flow, which forces the water onto the inside of the cyclone tubes, on which the liquid creates a continuous thin layer. The liquid layer on the inside of the cyclone tubes 8, 13, 18, is intended to absorb particles in the cyclone tubes 8, 13, 18.

The liquid will result in an improved air cleaning. It is suitable to have at least the third liquid inlet nozzle 56 for input of liquid into the third cyclone tube 18. The outlet from the third cyclone tube may suitably be separate from the outlet of the other cyclone tubes so that particles mixed with water are separated from particles without water. As a further alternative the third cyclone generator 17 may be separated from the other cyclone generators 6, 12, and may be placed outside the outer casing 2 so that particles with water are separated from dry particles.

In FIG. 5 the first cyclone tube 8 extends further down along the length axis 4 than the outer casing 2. The second cyclone tube 13 extends further down along the length axis 4 than the first cyclone tube 8. The third cyclone tube 18 extends further down along the length axis 4 than the second cyclone tube 13. This facilitates the provision of a tight seal between the plastic bag and the cyclone tubes 8, 13, 18, and the outer casing 2, respectively.

The diameter of the first cyclone tube 8 is denoted D in FIG. 5. The diameter of the upper portion 48 of the outer casing 2 is denoted D1 in FIG. 5. D1 is preferably in the interval 1.3 D-1.6 D. The largest diameter of the outer casing 2 is denoted D2 in FIG. 5. D2 is preferably in the interval 1.3 D1-1.8 D1.

Figure 6:
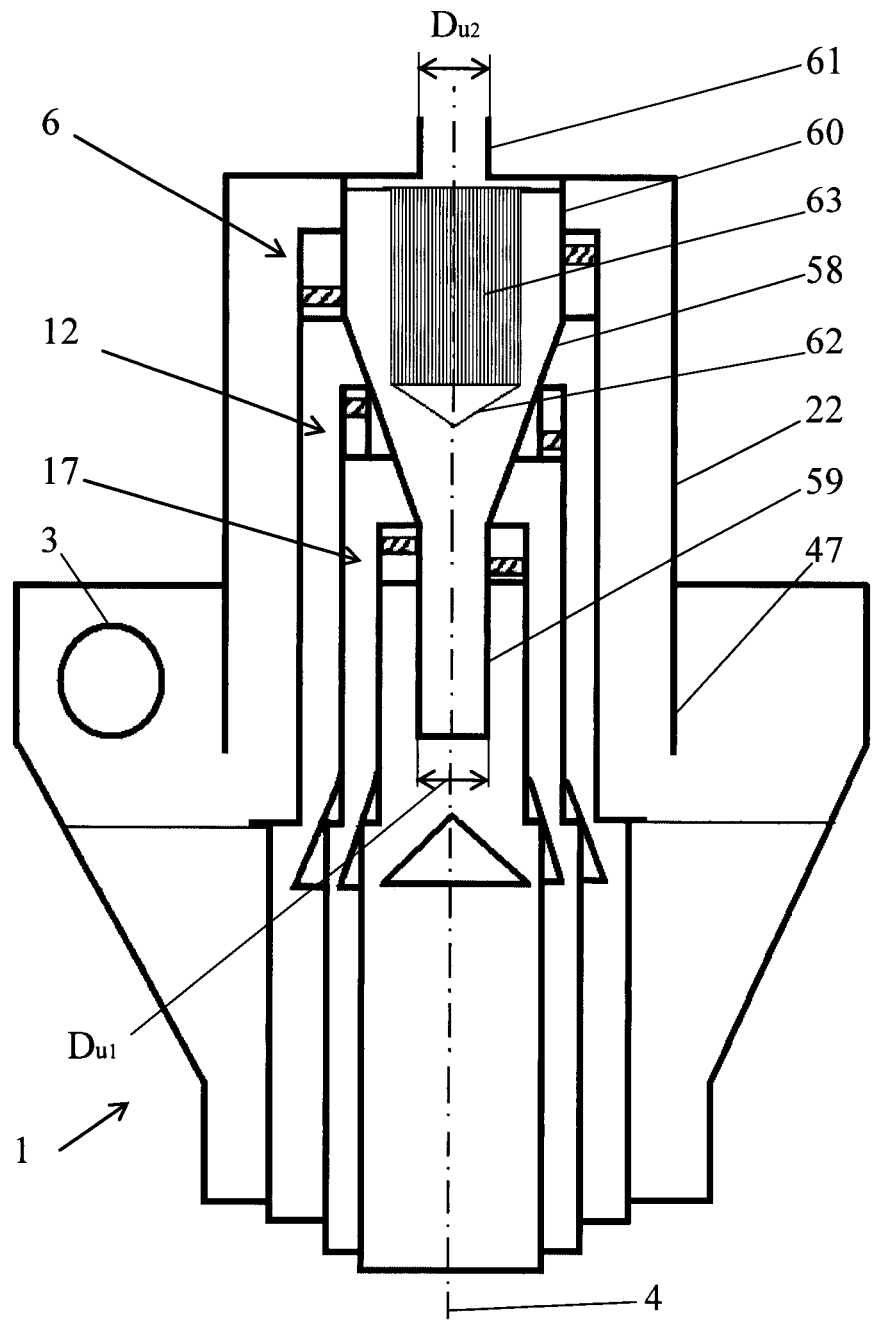
FIG. 6 shows a device according to an alternative embodiment of the present invention.

FIG. 6 shows a device 1 according to an alternative embodiment of the present invention. Only the differences in relation to the embodiment in FIG. 5 will be described. The device 1 is shown in a different view than in FIG. 5 and shows the primary inlet 3 perpendicular to its symmetry axis. The gas flow through the primary inlet 3 is thus directed perpendicularly to the plane of the paper. Thus, the primary inlet 3 is not inclined downwards but is directed in the peripheral direction. The outlet tube 22 of the device has a diameter $D_{U1}$ in its lower part 59. In contrast to the device in FIG. 5 the diameter of the outlet tube 22 in FIG. 5 increases in its upper part. As is evident from FIG. 6 a first intermediate part 58 of the outlet tube 59 is conical while a second intermediate part 60, which is arranged above the first intermediate part 58, is cylindrical. The upper part 61 of the outlet tube has a diameter $D_{U2}$ which is at least as big as the diameter $D_{U1}$ of the lower part of the outlet tube 59. The space that is occupied by the intermediate parts 58, 60, is in the device of FIG. 5 occupied by the blocking means 9, 14, 19.

A conical means 62 is arranged with its pointed end downwards in the first intermediate part 58 in order to direct the gas flow from the lower part 59 of the outlet tube towards the outer walls of the first intermediate part. The conical means 62 distributes the gas flow around the filter 63 without creating any substantial resistance or pressure.

Above the conical means 62 there is arranged a cylindrical filter 63 which in the shown embodiment is a HEPA-filter. The filter 63 is arranged so that the gas flow must pass the filter 63 to come from the second intermediate part 60 of the outlet tube 22 to the upper part 61 of the outlet tube 22. The device in FIG. 6 may be said to comprise a first separation step from the primary inlet to the first vortex generator 11. Particles are separated in the first separation step using inter alia the wall means 47. The device 1 may also be said to comprise a second separation step which comprises the cyclone generators 6, 12, 17. The device may also be said to comprise a third separation step which comprises the filter 63. In the first separation step the major part of the particles is filtered out, which particles may be large as well as small. In the second separation step on the whole only particles which are smaller than 1 micrometre are trapped, i.e., their largest measure is smaller than 1 micrometre. In the third separation step the main part of the particles, that could not be trapped in the first and the second separation step, are trapped. The particles that are trapped in the third separation step constitute only a small part of the particles that where conveyed with the gas flow in through the primary inlet 3.

The described embodiments may be varied in many ways without departing from the spirit and scope of the invention which is limited only by the claims.

It is of course possible for a person skilled in the art to omit the outer casing.

It is not necessary to have three different cyclone generators but two is sufficient according to the invention.

It is possible to have a larger number of cyclone generators in a device according to the invention. The number of cyclone generators may be four or more.

To further improve the filtration of the gas further cyclone generators may be arranged in the device.

In the described embodiments the device comprises a primary inlet in the side of the outer casing. In accordance with the invention it is however possible to omit the outer casing entirely or to have a completely different form or placement of the primary inlet.

With annular inlets is not meant that the inlets have to be delimited by two concentric circles but with annular inlet is meant inlets which are generally annular.

The invention claimed is:

1. Device for separation of particles from a flow of gas, comprising
   a first cyclone generator comprising a first cyclone tube with a length axis and a first blocking means arranged so that an annular first inlet is arranged between the first cyclone tube and the first blocking means, and a first vortex generator arranged in the annular first inlet,
   a further cyclone generator comprising a further cyclone tube with a length axis and a further blocking means arranged so that an annular further inlet is arranged between the further cyclone tube and the further blocking means, and a further vortex generator arranged in the annular further inlet at a distance from the first vortex generator, and
   an outlet tube comprising an outlet and a length axis, which outlet tube is arranged concentric in relation to the further cyclone tube,
   wherein the first cyclone tube encloses the further cyclone tube at a distance from the further cyclone tube, wherein the first blocking means has substantially a same extension as the further inlet such that the first blocking means substantially overlaps the further inlet seen in a direction of the length axis so that the particles after a passage of the vortex generator in the first cyclone generator move inwards towards the length axis in order to be able to be conveyed into the further inlet to the following cyclone generator and the further blocking means has substantially a same extension as the outlet seen in the direction of the length axis towards the outlet, and the further cyclone generator is arranged between the first cyclone generator and the outlet.

2. The device according to claim 1, comprising a second cyclone generator comprising a second cyclone tube with a length axis and a second blocking means arranged so that an annular second inlet is arranged between the second cyclone tube and the second blocking means, and a second vortex generator arranged in the annular second inlet at a distance from the first vortex generator, wherein the further cyclone generator is a third cyclone generator, the further cyclone tube is a third cyclone tube, the further blocking means is a third blocking means, the annular further inlet is a third inlet and the further vortex generator is a third vortex generator.

3. The device according to claim 1, wherein the outlet tube, the first cyclone generator, and the further cyclone generator are arranged with respective length axes essentially parallel to each other.

4. The device according to claim 3, comprising a primary blocking means which is arranged at a distance from the first cyclone generator and which overlaps the first inlet seen in the direction of the length axis towards the first inlet.

5. The device according to claim 3, comprising an outer casing arranged enclosing the first cyclone tube at a distance from the first cyclone tube and a primary inlet in through the outer casing.

6. The device according to claim 5, wherein the primary inlet is arranged on the opposite side of the primary blocking means in relation to the first vortex generator.

7. The device according to claim 5, wherein the primary inlet is arranged below the annular first inlet when the length axis is arranged vertical with the annular first inlet above the annular further inlet.

8. The device according to claim 7, wherein the outer casing comprises a conical portion below the primary inlet, wherein the conical portion tapers downwards.

9. The device according to claim 7, comprising a wall means which extends from the outer casing and which has such an extension downwards that, in use, the flow of gas must move downwards before the flow of gas may move upwards on an outside of the first cyclone tube.

10. The device according to claim 7, wherein the primary inlet is arranged so that, in use, the gas flow from the primary inlet is directed partly downwards.

11. The device according to claim 5, wherein the first cyclone tube and the further cyclone tube comprise a far part which is arranged on a far side of the outlet in relation to the first vortex generator and the further vortex generator and which is wider perpendicular to the length axis than the annular first inlet and the annular further inlet.

12. The device according to claim 11, comprising, in a far end of the further cyclone tube at a largest distance from the first cyclone tube, a conical vortex dissolver which is arranged with a narrow part directed towards the first vortex generator and the further vortex generator.

13. The device according to claim 12, wherein a side of the conical vortex dissolver, which is turned away from the first vortex generator and the further vortex generator, comprises a cavity and in the cavity is provided with tabs having planes that are parallel to the length axes.

14. The device according to claim 12, wherein the outlet tube from the outlet extends in a direction towards the first vortex generator and the further vortex generator.

15. The device according to claim 14, wherein a distance between the outlet and the vortex dissolver is in an interval 5-200% and preferably 20-100% of a distance between the outlet and a most nearby of the first vortex generator and the further vortex generator.

16. The device according to claim 12, wherein the outlet tube from the outlet extends in a direction away from the first vortex generator and the further vortex generator.

17. The device according to claim 16, wherein a distance between the outlet and the vortex dissolver is in an interval 50-800% and preferably in an interval 100-400% of a distance between the outlet and a most nearby of the first vortex generator and the further vortex generator.

18. The device according to claim 11, wherein a distance along the length axis between the first vortex generator and the further vortex generator is smaller than or equal to the length of the first vortex generator or the further vortex generator along the length axis.

19. The device according to claim 11, wherein the first cyclone tube, the further cyclone tube, and the outer casing are open in a respective lower edge and wherein the outer casing is adapted for arrangement of a plastic bag on an outside of the outer casing which covers the lower edge of the outer casing.

20. The device according to claim 11 comprising a liquid container and at least one liquid outlet nozzle in connection with the liquid container from which the liquid outlet nozzle liquid is output and conveyed to the inside of one of the cyclone tubes.

* * * * *